United States Patent
Cai et al.

(10) Patent No.: US 9,071,546 B2
(45) Date of Patent: Jun. 30, 2015

(54) PROTOCOL INDEPENDENT MULTICAST DESIGNATED ROUTER REDUNDANCY

(75) Inventors: Yiqun Cai, Cupertino, CA (US); Heidi Ou, Saratoga, CA (US)

(73) Assignee: Cisco Technology, Inc., San Jose, CA (US)

(*) Notice: Subject to any disclaimer, the term of this patent is extended or adjusted under 35 U.S.C. 154(b) by 242 days.

(21) Appl. No.: 13/068,789

(22) Filed: May 20, 2011

(65) Prior Publication Data
US 2012/0294308 A1 Nov. 22, 2012

(51) Int. Cl.
| H04L 12/28 | (2006.01) |
| H04L 12/721 | (2013.01) |
| H04L 12/761 | (2013.01) |
| H04L 12/707 | (2013.01) |
| H04L 12/18 | (2006.01) |

(52) U.S. Cl.
CPC ............ *H04L 45/38* (2013.01); *H04L 45/22* (2013.01); *H04L 12/185* (2013.01); *H04L 45/16* (2013.01)

(58) Field of Classification Search
None
See application file for complete search history.

(56) References Cited

U.S. PATENT DOCUMENTS

| 6,985,959 | B1 * | 1/2006 | Lee | 709/238 |
| 7,065,059 | B1 * | 6/2006 | Zinin | 370/312 |
| 7,860,093 | B2 * | 12/2010 | Shepherd et al. | 370/390 |
| 7,911,977 | B2 * | 3/2011 | Boers et al. | 370/255 |
| 7,969,981 | B2 * | 6/2011 | Asati et al. | 370/390 |
| 2003/0067924 | A1 * | 4/2003 | Choe et al. | 370/400 |
| 2003/0123457 | A1 * | 7/2003 | Koppol | 370/400 |
| 2003/0128668 | A1 * | 7/2003 | Yavatkar et al. | 370/238 |
| 2004/0017801 | A1 * | 1/2004 | Jacquemin et al. | 370/352 |
| 2004/0136371 | A1 * | 7/2004 | Muralidhar et al. | 370/389 |
| 2004/0246948 | A1 * | 12/2004 | Lee et al. | 370/352 |
| 2005/0135357 | A1 * | 6/2005 | Riegel et al. | 370/389 |
| 2006/0092859 | A1 * | 5/2006 | Choi et al. | 370/254 |
| 2006/0209787 | A1 * | 9/2006 | Okuda | 370/351 |
| 2006/0268869 | A1 * | 11/2006 | Boers et al. | 370/390 |
| 2006/0291444 | A1 * | 12/2006 | Alvarez et al. | 370/351 |
| 2007/0165632 | A1 * | 7/2007 | Zwiebel | 370/390 |
| 2008/0049763 | A1 * | 2/2008 | Damm et al. | 370/400 |
| 2009/0161670 | A1 * | 6/2009 | Shepherd et al. | 370/389 |
| 2009/0252033 | A1 * | 10/2009 | Ramakrishnan et al. | 370/228 |
| 2013/0121142 | A1 * | 5/2013 | Bai et al. | 370/228 |

OTHER PUBLICATIONS

IETF RFC 4601, "Protocol Independent Multicast—Sparse Mode (PIM-SM): Protocol Specification (Revised)", Aug. 2006.

* cited by examiner

*Primary Examiner* — Marsha D Banks Harold
*Assistant Examiner* — Christopher Wyllie
(74) *Attorney, Agent, or Firm* — Cindy Kaplan (57) ABSTRACT

In one embodiment, a method includes transmitting a packet from a router located in a communication path between a source and a receiver, the load balancing packet having one or more values used to select a group designated router from a list of candidate group designated routers for multicast traffic streams, selecting the router as said group designated router for one or more of the multicast traffic streams, and forwarding traffic for the one or more multicast traffic streams to the receiver. The candidate group designated routers are last hop routers for transmitting the multicast traffic streams to a common link connected to the receiver. An apparatus is also disclosed.

11 Claims, 5 Drawing Sheets

PROTOCOL INDEPENDENT MULTICAST DESIGNATED ROUTER REDUNDANCY

TECHNICAL FIELD

The present disclosure relates generally to communication networks, and more particularly, to routing multicast traffic.

BACKGROUND

Networks configured to deliver video or data requiring high availability may use a Live-Live deployment. Live-Live refers to the transmission of redundant data streams through the network using path separation and dedicated infrastructure. The redundant data streams may be sent, for example, to different multicast groups. Live-Live attempts to eliminate packet loss in the event of a single network failure. When Live-Live is implemented with full physical path separation, it can provide resiliency for a failure at a network device or link in the network.

BRIEF DESCRIPTION OF THE FIGURES

Corresponding reference characters indicate corresponding parts throughout the several views of the drawings.

DESCRIPTION OF EXAMPLE EMBODIMENTS

Overview

In one embodiment, a method generally comprises transmitting a packet from a router located in a communication path between a source and a receiver, the packet comprising one or more values used to select a group designated router from a list of candidate group designated routers for multicast traffic streams, selecting the router as the group designated router for one or more of the multicast traffic streams, and forwarding traffic for the one or more multicast traffic streams to the receiver. The candidate group designated routers are last hop routers for transmitting the multicast traffic streams to a common link connected to the receiver.

In another embodiment, an apparatus generally comprises a processor for generating a packet comprising one or more values used to select a group designated router from a list of candidate group designated routers for one or more multicast traffic streams transmitted from a source to a receiver, selecting the apparatus as the group designated router for one or more of the multicast traffic streams, and forwarding traffic for the one or more multicast traffic streams to the receiver. The apparatus further includes memory for storing the values used to select the group designated router. The candidate group designated routers are last hop routers for transmitting the multicast traffic streams to a common link connected to the receiver.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

The embodiments described herein provide designated router redundancy that can be used with a Live-Live deployment or other environment to support load balancing among last hop routers and provide network resiliency.

Figure 1:
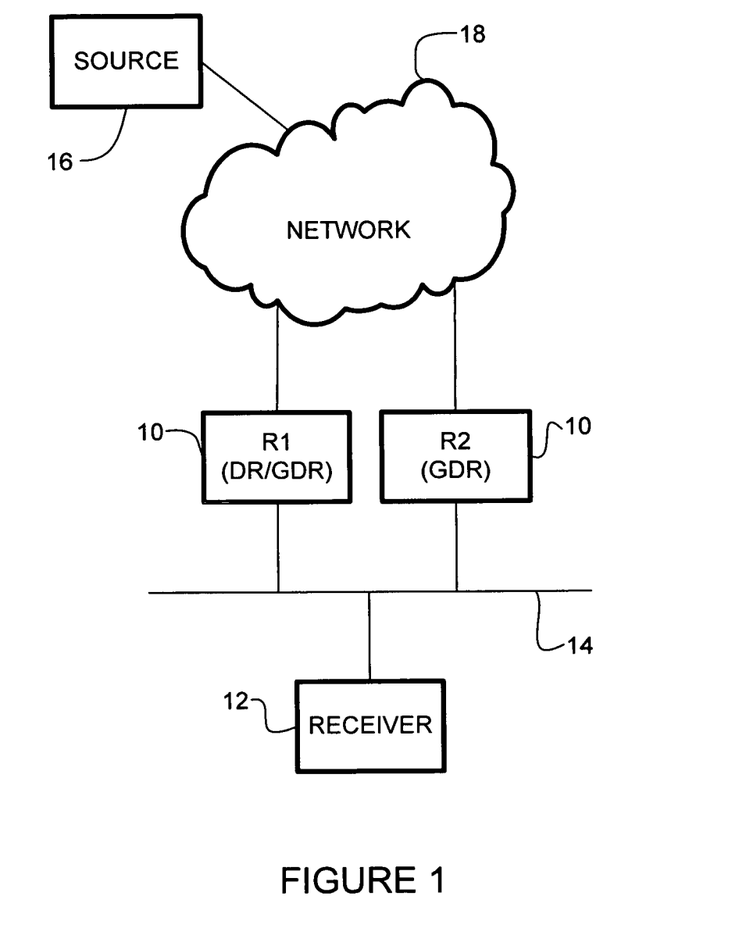
FIG. 1 illustrates an example of a network in which embodiments described herein may be implemented.

Referring now to the drawings, and first to FIG. 1, an example of a network in which the embodiments described herein may be implemented is shown. The embodiments operate in the context of a data communication network including multiple network devices (nodes). The network includes routers 10 in communication with a receiver 12 via a common link (uplink/downlink) 14 (e.g., local area network (LAN)) and a source 16 via transport network (e.g., service provider network, enterprise network, etc.) 18. The routers 10 may be PIM (Protocol Independent Multicast) routers or any other network device configured to perform routing or forwarding operations.

The network 18 includes a series of nodes interconnecting communication paths for receiving and transmitting packets of information that propagate through the network. The network 18 may include one or more networks including a local area network, wireless local area network (WLAN), metropolitan area network (MAN), wide area network (WAN), Intranet, virtual private network (VPN), or any other topology that facilitates communications in a network environment.

For simplification, only one receiver 12 and one source 16 are shown in FIG. 1, however, there may be any number of receivers or sources. The receiver 12 and source 16 may be any device configured for transmitting, receiving, or transmitting and receiving data flows. For example, the source 16 may be a content provider of broadcast video (e.g., cable company, digital satellite company), content delivery node, server, etc. The receiver 12 may be, for example, a host, server, personal computer, media center device, mobile device (e.g., phone, personal digital assistant, digital media player), set-top box, or any other device capable of audio, video, or data exchanges within the network. The receiver 12 may be associated with a client, customer, or end user wanting to initiate a communication in the network.

Traffic between the source 16 and receiver 12 may comprise content (e.g., media content), including, for example, video, audio, data, or any combination thereof. The media content may be transmitted as streaming media or media files, for example, and the data may be encrypted, compressed, or encoded according to any format. There may be any number of intermediate nodes such as routers, switches, or gateways located between the sender (content source) 16 and receiver (content consumer) 12.

In one example, the data flow is a multicast transmission, and may comprise, for example, IPv4 multicast, IPv6 multicast, or IPv4/IPv6 multicast using MPLS (Multiprotocol Label Switching) encapsulation. Multicast is a bandwidth-conserving technology that reduces traffic by simultaneously delivering data to multiple receivers. In IP multicasting, the source 16 may specify a destination IP address that may comprise a multicast group address for any number of receivers to receive the data flow. Multicast packets are sent from a source (S) address to a group (G) address. A multicast group is an arbitrary group (G) of receivers that express an interest in receiving a particular data stream from a source (S). A receiver seeking to receive data sent to a multicast group can join the group using, for example, Internet Management Group Protocol (IGMP). Join messages are typically sent from the receiver 12 to the source 16, and the data flow propagates in the opposite direction. Receivers that are members of a given multicast group can receive data sent to that multicast group. The receiver may be a host that has asked to join a group and may obtain information about the group via a Web page, SDP (session description protocol), etc.

As described below, one of the routers 10 (R1 in FIG. 1) is elected as a designated router and one or more of the routers (R1 and R2 in FIG. 1) are each selected as a group designated router (GDR) for a multicast traffic stream (packet flow, data flow, media content, data transfer, etc.) associated with a group, rendezvous point (RP), or source and group.

It is to be understood that the network shown in FIG. 1 and described herein is only an example and that the embodiments may be implemented in networks having different network topologies and network devices, without departing from the scope of the embodiments.

In one example, the network 18 is configured for a Live-Live deployment. Live-Live provides a method for sending redundant data streams through the network. For example, Live-Live may be configured to provide dual transmission of the same transport data using different IP headers. The packet flows are forwarded onto diverse paths built using various technologies (e.g., MT-IGP (Multi-Topology Internet Gateway Protocol), multiple IGP processes, etc.). The two IP packet flows may be, for example (S1, G1) and (S2, G2). In the example of FIG. 1, the receiver 12 has only one common uplink/downlink path (LAN 14) and therefore G1 and G2 are received by the receiver 12 from the same interface.

The shared media LAN 14 has multiple upstream routers (i.e., last hop routers) 10 connected thereto. One of these routers 10 is elected as the designated router (DR) to act on behalf of directly connected hosts with respect to the PIM protocol. The designated router may be elected, for example, as described in IETF RFC 4601 ("Protocol Independent Multicast—Sparse Mode (PIM-SM): Protocol Specification (Revised)", B. Fenner et al., August 2006). The designated router on LAN 14 is the router with the most preferred designated router priority and wins a tie breaker using its IP address on the interface.

In conventional networks, the elected designated router is responsible for forwarding to the LAN 14 for both groups G1 and G2. This results in a potential single point of failure. The service provider may not control what groups the sources use to send the media, however, the service provider does control what rendezvous point (RP) addresses are configured on the last hop router 10. The rendezvous point is a router in a multicast network domain that acts as a shared root for a multicast shared tree. Join messages from receivers for a group are sent towards the RP, and data from senders is sent to the RP so that receivers can discover who the senders are and start to receive traffic destined for the group. The service provider can apply its policy for the embodiments described herein via the definition, placement, and routing of the rendezvous point.

As described in detail below, the embodiments provide a rendezvous point/group/source based designated router selection to support load balancing in the last hop and provide Live-Live deployment which includes the last hop routers (designated router redundancy). The rendezvous point/group/source based designated router is referred to herein as a group designated router (GDR). As noted above, there is only one designated router on the LAN 14, but there may be any number of group designated routers. In one embodiment, a hash algorithm (described below) is used to select the group designated router. The group designated router is responsible for initiating tree building for the corresponding group, rendezvous point, source, or any combination thereof.

Figure 2:
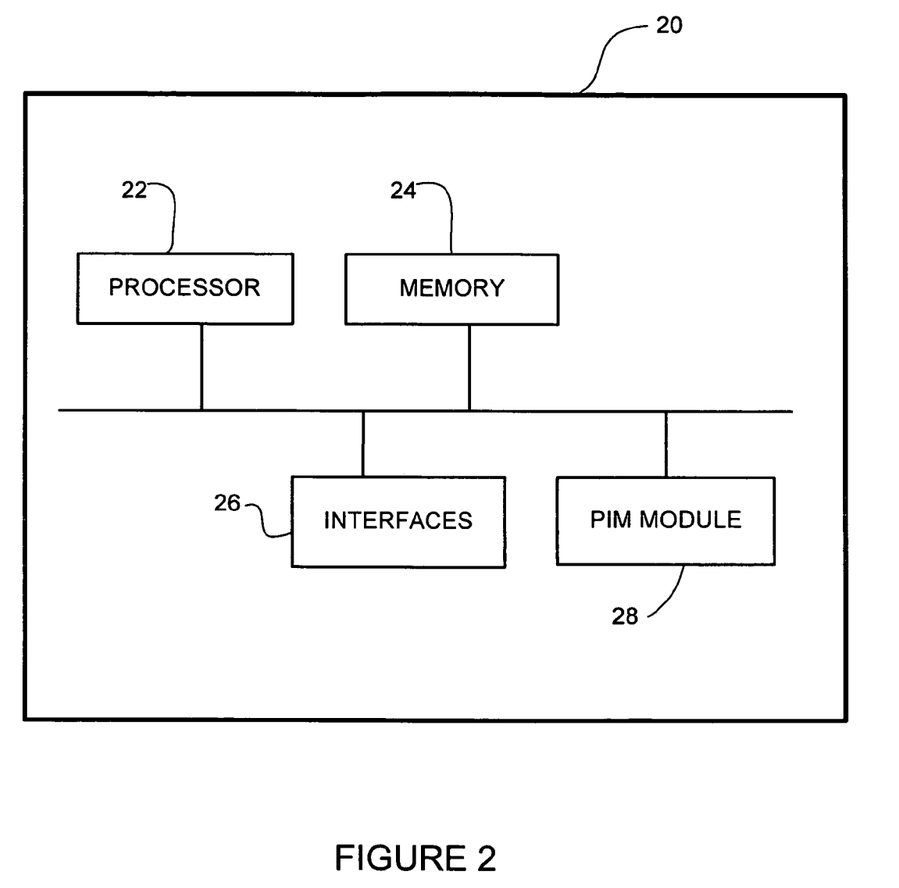
FIG. 2 depicts an example of a network device that may be used to implement the embodiments.

FIG. 2 illustrates an example of a network device (e.g., router) 20 that may be used to implement the embodiments described herein. In one embodiment, the network device 20 is a programmable machine that may be implemented in hardware, software, or any combination thereof. The network device 20 includes one or more processors 22, memory 24, and network interfaces 26. Memory 24 may be a volatile memory or non-volatile storage, which stores various applications, operating systems, modules, and data for execution and use by the processor 22. For example, the memory 24 may store routing tables, entries, network configurations, policies, forwarding trees, etc.

Logic may be encoded in one or more tangible media for execution by the processor 22. For example, the processor 22 may execute codes stored in a computer-readable medium such as memory 24. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium.

An operating system, portions of which may be resident in memory 24 and executed by the processor 22, may functionally organize the network node by invoking network operations in support of software processes executing on the processor. These software processes may include PIM module 28. The memory 24 may also include a routing information base (RIB) (not shown). The PIM module 28 may rely on an underlying topology-gathering protocol to populate a routing table for the RIB to establish and maintain paths or routes. The PIM module 28 may also generate and transmit PIM packets, including load balancing packets described below. The embodiments described herein may be used with PIM Sparse Mode (PIM-SM) or PIM Dense Mode (PIM-DM). PIM Source-Specific Multicast (PIM-SSM) and PIM Any-Source Multicast (PIM-ASM) may be used.

The network interface 26 may comprise one or more interfaces (linecards, ports) for receiving data or transmitting data to other devices. The interfaces 26 may include, for example, an Ethernet interface for connection to a computer or network.

It is to be understood that the network device 20 shown in FIG. 2 and described above is only one example and that different configurations of network devices may be used.

Figure 3:
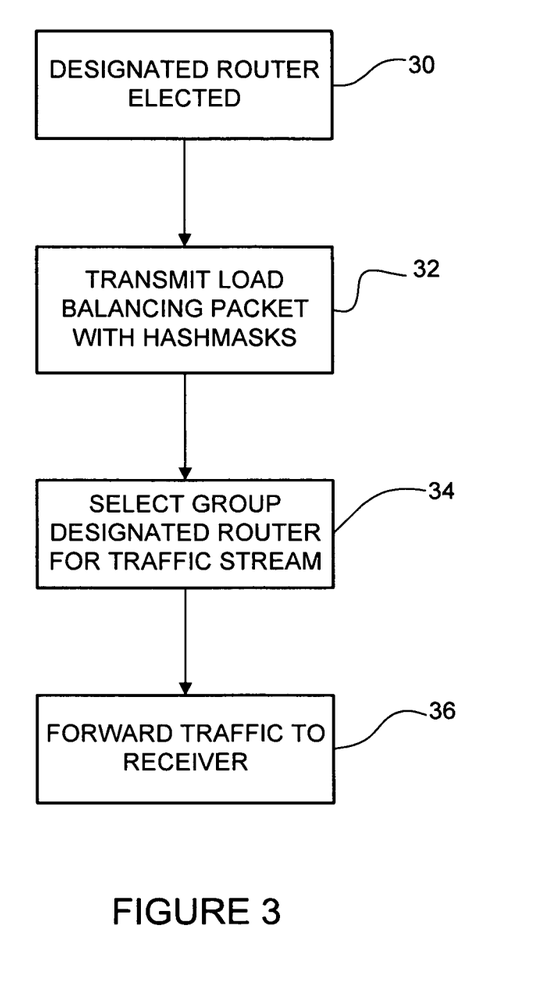
FIG. 3 is a flowchart illustrating an overview of a process for providing designated router redundancy, in accordance with one embodiment.

FIG. 3 is a flowchart illustrating an overview of a process for providing designated router redundancy, in accordance with one embodiment. At step 30, one of the last hop routers 10 is elected as the designated router. The election process may be performed as described in RFC 4601 (referenced above), for example. In one embodiment, routers 10 with the same designated router priority as the designated router become candidate group designated routers. As shown in FIG. 1, the candidate group designated routers 10 are last hop routers that transmit multicast traffic streams to a common link 14 connected to the receiver 12. Each candidate group designated router transmits a packet (e.g., load balancing packet) (step 32). The packet includes one or more values (e.g., hashmasks described below) used to select a group designated router from a list of candidate group designated routers for the multicast traffic streams. In one embodiment, each traffic stream is associated with a multicast group, rendezvous point, or source and group. One of the candidate GDRs is selected as the group designated router for each traffic stream (step 34). In one embodiment, a hash algorithm is used to determine which candidate GDR becomes the group designated router for the RP, group, or source and group. The group designated router is responsible for initiating tree building for the corresponding group/RP/source and forwards traffic for the traffic stream to the receiver (step 36).

It is to be understood that the process shown in FIG. 3 and described above is only one example and that steps may be added, removed, or combined without departing from the scope of the embodiments.

Figure 4:
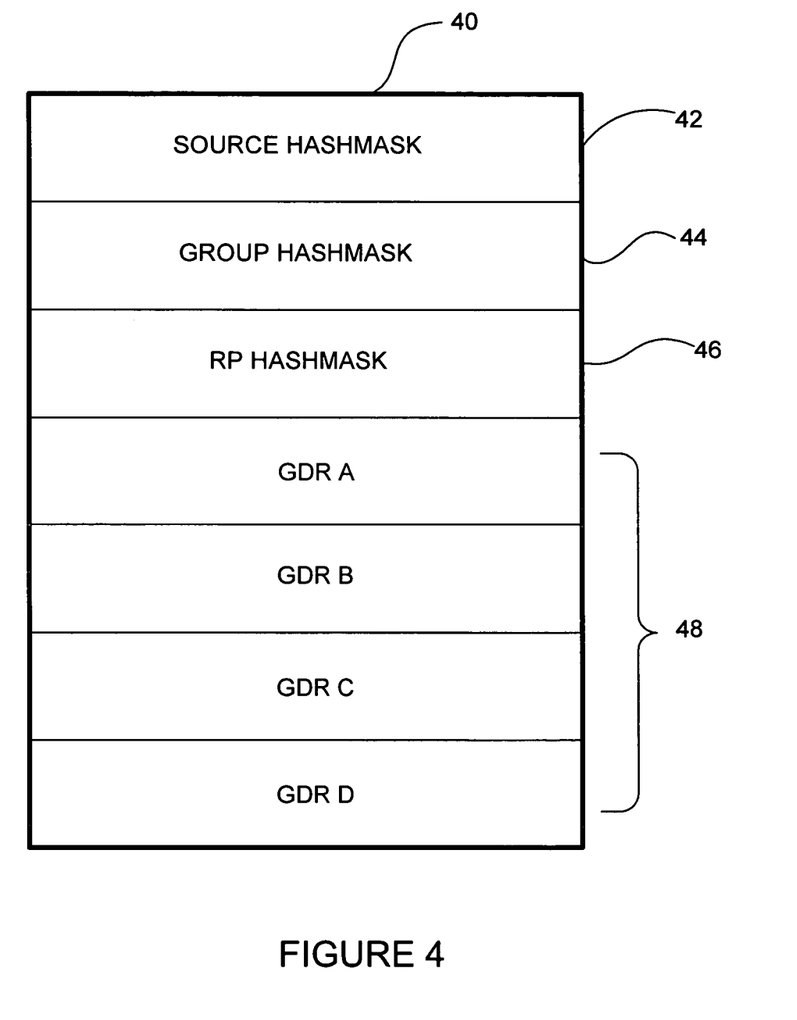
FIG. 4 depicts an example of a load balancing packet for use in the process shown in FIG. 3, in accordance with one embodiment.

FIG. 4 illustrates an example of a load balancing packet 40 transmitted from a designated router. In one embodiment, the load balancing packet 40 is a PIM Hello packet with a load balancing TLV (type-length-value) option. The load balancing packet 40 transmitted from a designated router includes a source hashmask 42, group hashmask 44, and rendezvous point hashmask 46 (values used to select the GDR) and a list of candidate group designated routers (e.g., GDR A, GDR B, GDR C, GDR D) 48. In one embodiment, only the designated router load balancing packet includes a list of candidate GDRs. Each potential GDR attaches the load balancing Hello TLV option to announce its intention to become a GDR, however, only the hashmasks 42, 44, and 46 are included in the packet. The candidate GDRs are preferably configured with the same mask and support the same source, group and RP hash. If they are not the same, the mask announced by the designated router takes precedence.

The following describes examples of hashmasks and hash calculations used in selection of the group designated router, in accordance with one embodiment.

The hashmask is used to extract a number of bits from the corresponding IP address field (32 bits for IPv4, 128 bits for IPv6), and calculate a hash value. For example, 0.255.0.0 defines a hashmask for an IPv4 address that masks the first, third, and fourth octets. The hashmask may be a RP hashmask, source hashmask, or a group hashmask. The hashmasks are configured on the PIM routers that can potentially become group designated routers (candidate group designated routers).

The hash value calculation may be performed on the group, rendezvous point (RP), or source and group hashmasks. For example, with Any-Source Multicast (ASM), the hash value is calculated using the RP or group hashmask. With Source-Specific Multicast (SSM), the hash value is calculated using both the source and group hashmasks.

The rendezvous point hash value is calculated as follows:

$$hashvalue\_RP=((RP\_address \ \& \ RP\_hashmask)>>N) \ \% \ M$$

where:
RP_address is the address of the RP defined for the group;
N is the number of bits that are 0 from the right; and
M is the number of candidate GDRs.

The RP hash value is used for ASM groups if RP_hashmask is not equal to zero.

If RP_hashmask is equal to zero, the hash value is calculated using the group hashmask as shown below:

$$hashvalue\_Group=((Group\_address \ \& \ Group\_hashmask)>>N) \ \% \ M$$

where:
N is the number of bits that are 0 from the right; and
M is the number of candidate GDRs.

For SSM groups, a hash value is calculated using both the source and group hashmasks as follows:

$$hashvalue\_SG=(((Source\_address \ \& \ Source\_hashmask)>>N\_S)\ \hat{}\ ((Group\_address \ \& \ Group\_hashmask)>>N\_G)) \ \% \ M$$

where:
N_S and N_G are the number of bits that are 0 from the right in the source mask and group mask, respectively; and
M is the number of candidate GDRs.

The following describes an example of operation at router R2 in FIG. 1 after a join message is received. The router R2 determines if it is the group designated router, in which case the router is responsible for building forwarding trees. The process performed is dependent on whether the group is ASM or SSM and whether the rendezvous point hashmask is 0. The designated router (R1 in FIG. 1) assigns an ordinal number to each of the candidate GDRs (e.g., R1 is 0 and R2 is 1). This assignment may also be made implicitly by sorting R1 and R2 using their IP addresses.

If the group is ASM and the RP hashmask announced by the DR is not 0, the router R2 calculates the value of hashvalue RP. If hashvalue RP is the same as the number assigned to router R2 by the DR, router R2 becomes the GDR. If the group is ASM and the RP hashmask announced by the DR is 0, the router R2 calculates the value of the hashvalue_Group and compares it to the ordinal value of router R2 assigned by the DR in order to decide if router R2 is the GDR. If the group is SSM, the router uses hashvalue_SG to determine if router R2 is the GDR.

Figure 5:
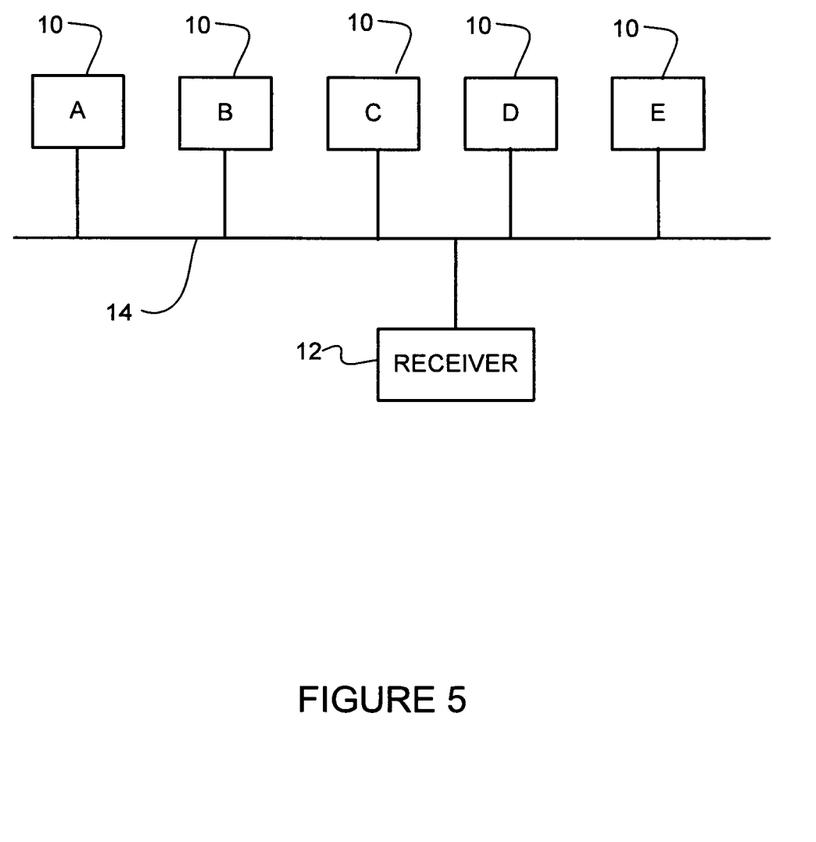
FIG. 5 illustrates an example of a plurality of last hop routers in communication with a common link connected to a receiver.

FIG. 5 illustrates an example of PIM routers 10 (A, B, C, D, E) connected to a common link (LAN) 14 connected to receiver 12. The last hop routers 10 are also in communication with one or more sources (not shown). In this example, routers A, B, C, and D have the same DR priority and router E has a lower priority. The group mask is 0.255.0.0 (IPv4) and the source mask is 0.0.0.0. In a first example, router B comes up and announces mask (0.255.0.0, 0.0.0.0). B becomes the DR and includes its own address in the load balancing packet.

Router A next comes up and announces mask (0.255.0.0, 0.0.0.0). Router A wins DR election and announces both routers A and B as candidate GDRs in the load balancing packet. Router B loses the DR election and announces only the masks. Since there are only two routers, router A is the GDR for groups with hash value 0 (e.g., 239.0/16, 239.2/16, . . . ). Router B is the GDR for groups with hash value 1 (e.g., 239.1/16, 239.3/16, . . . ).

Router E now comes up and announces mask (0.255.0.0, 0.0.0.0). Router E loses DR election due to DR priority and continues to announce the mask. Router A does not include router E in its load balancing packet due to router E's DR priority.

Routers C and D come up and announce mask (0.255.0.0, 0.0.0.0). Router A now announces routers A, B, C, and D, in its load balancing packet. Router A will be GDR for 239.{0, 4, 8 . . . }.0.0/16; router B will be GDR for 239.{1, 5, 9 . . . }.0.0/16; router C will be GDR for 239.{2, 6, 10 . . . }.0.0/16; and router D will be GDR for 239.{3, 7, 11 . . . }.0.0/16.

If router C is shutdown or its DR priority decreases, router A will only announce A, B, and D, in its load balancing packet. Router A will be GDR for 239. {0, 3, 6 . . . }.0.0/16;

router B will be GDR for 239.{1, 4, 7 . . . }.0.0/16; and router D will be GDR for 239.{2, 5, 8 . . . }.0.0/16.

In some cases, a traffic disruption may occur when one or more of the routers comes up or goes down. When routers restart, for example, the GDR may change for a group and this may result in dropping of packets. In one example, the Live-Live streams are G1 and G2, and router A is the GDR for G1 and router B is the GDR for G2. When router C comes online, it is possible that router B becomes GDR for G1 and router C becomes GDR for G2. In order to minimize possible packet loss, the following process may be used.

When the role of GDR changes, instead of immediately stopping forwarding, routers A and B continue forwarding to G1 and G2, respectively. At the same time, routers B and C build forwarding trees for G1 and G2, respectively. A modified assert tie-breaker (referred to as a GDR Assert) is used. The conventional tie breakers are used to select an assert winner with one modification. Rather than comparing IP addresses as the last resort, a router considers whether the sender of an assert is a GDR. In this example, router A will let router B be the assert winner for G1 and router B does the same for router C for G2. This will result in some duplicates in the network while minimizing packet loss.

Although the method and apparatus have been described in accordance with the embodiments shown, one of ordinary skill in the art will readily recognize that there could be variations made without departing from the scope of the embodiments. Accordingly, it is intended that all matter contained in the above description and shown in the accompanying drawings shall be interpreted as illustrative and not in a limiting sense.

What is claimed is:

1. A method comprising:
    transmitting a load balancing packet from a router located in a communication path between a source and a receiver, the packet comprising one or more values used to select a group designated router from a list of candidate group designated routers for multicast traffic streams, one of said candidate group designated routers comprising a designated router elected based on router priority and comprising a list of said candidate group designated routers;
    selecting the router as said group designated router for one or more of said multicast traffic streams based on load balancing packets received from said candidate group designated routers, each of said multicast traffic streams associated with a multicast group, a rendezvous point, or the source and the multicast group to provide load balancing based on said rendezvous point or the source and the multicast group, the group designated router responsible for initiating tree building and forwarding said multicast traffic streams to the receiver; and
    forwarding traffic for said one or more multicast traffic streams to the receiver;
    wherein the candidate group designated routers are last hop routers for transmitting said multicast traffic streams to a common link connected to the receiver, providing redundancy of the group designated routers, and applying policies via a placement and routing of the rendezvous point;
    wherein at least two of said multicast traffic streams are redundant streams and a different group designated router is selected for each of said redundant streams; and
    wherein said one or more values comprise hashmasks, said hashmasks configured on routers that can potentially become said candidate group designated routers.

2. The method of claim 1 wherein the packet comprises a protocol independent multicast hello packet.

3. The method of claim 1 wherein said hashmasks comprise a rendezvous point hashmask, a source hashmask, and a group hashmask.

4. The method of claim 1 wherein selecting the router as said group designated router comprises executing a hash algorithm.

5. The method of claim 1 wherein said common link comprises a local area network.

6. An apparatus comprising:
    a processor for generating a load balancing packet comprising one or more values used to select a group designated router from a list of candidate group designated routers for multicast traffic streams transmitted from a source to a receiver, selecting the apparatus as said group designated router for one or more of said multicast traffic streams based on load balancing packets received from said candidate group designated routers, and forwarding traffic for said one or more multicast traffic streams to the receiver, one of said candidate group designated routers comprising a designated router elected based on router priority and comprising a list of said candidate group designated routers; and
    memory for storing said one or more values used to select said group designated router;
    wherein the candidate group designated routers are last hop routers for transmitting said multicast traffic streams to a common link connected to the receiver, providing redundancy of the group designated routers, and applying policies via placement and routing of the rendezvous point;
    wherein at least two of said multicast traffic streams are redundant streams and a different group designated router is selected for each of said redundant streams;
    wherein, each of said multicast traffic streams associated with a multicast group, a rendezvous point, or the source and the multicast group to provide load balancing based on said rendezvous point or the source and the multicast group, the group designated router responsible for initiating tree building and forwarding said multicast traffic streams to the receiver; and
    wherein said one or more values comprise hashmasks, said hashmasks configured on routers that can potentially become said candidate group designated routers.

7. The apparatus of claim 6 wherein the packet comprises a protocol independent multicast hello packet.

8. The apparatus of claim 6 wherein the processor is operable to execute a hash algorithm to select the apparatus as said group designated router.

9. Logic encoded on one or more non-transitory computer readable media for execution and when executed operable to:
    transmit a load balancing packet from a router located in a communication path between a source and a receiver, the packet comprising one or more values used to select a group designated router from a list of candidate group designated routers for multicast traffic streams, one of said candidate group designated routers comprising a designated router elected based on router priority and comprising a list of said candidate group designated routers;
    select the router as said group designated router for one or more of said multicast traffic streams based on load balancing packets received from said candidate group designated routers and comprising rendezvous point, or source and group information, each of said multicast traffic streams associated with a multicast group, a rendezvous point, or the source and the multicast group to provide load balancing based on said rendezvous point or the source and the multicast group, the group designated router responsible for initiating tree building and forwarding said multicast traffic streams to the receiver; and forward traffic for said one or more multicast traffic streams to the receiver;

wherein the candidate group designated routers are last hop routers for transmitting said multicast traffic streams to a common link connected to the receiver, providing redundancy of the group designated routers, and applying policies via a placement and routing of the rendezvous point;

wherein at least two of said multicast traffic streams are redundant streams and a different group designated router is selected for each of said redundant streams; and wherein said one or more values comprise hashmasks, said hashmasks configured on routers that can potentially become said candidate group designated routers.

10. The logic of claim 9 further comprising logic operable to select said group designated router as an assert winner following a change in the candidate group designated routers.

11. The logic of claim 9 wherein said hashmasks comprise a rendezvous point hashmask, a source hashmask, and a group hashmask.

* * * * *